United States Patent
Mun et al.

(10) Patent No.: US 10,276,862 B2
(45) Date of Patent: Apr. 30, 2019

(54) COMPOSITE CATHODE ACTIVE MATERIAL, METHOD OF PREPARING THE COMPOSITE CATHODE ACTIVE MATERIAL, AND CATHODE AND LITHIUM BATTERY EACH INCLUDING THE COMPOSITE CATHODE ACTIVE MATERIAL

(71) Applicant: Samsung SDI Co., Ltd., Yongin-si, Gyeonggi-do (KR)

(72) Inventors: Jun-young Mun, Seoul (KR); Jin-hwan Park, Seoul (KR); Gue-sung Kim, Yongin-si (KR); Jun-ho Park, Gyeonggi-do (KR); Jae-gu Yoon, Suwon-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 285 days.

(21) Appl. No.: 14/051,600

(22) Filed: Oct. 11, 2013

(65) Prior Publication Data
US 2014/0120378 A1    May 1, 2014

(30) Foreign Application Priority Data

Oct. 25, 2012  (KR) ........................ 10-2012-0119294

(51) Int. Cl.
*H01M 4/36* (2006.01)
*H01M 4/139* (2010.01)
(Continued)

(52) U.S. Cl.
CPC .......... *H01M 4/366* (2013.01); *H01M 4/139* (2013.01); *H01M 4/62* (2013.01); *H01M 4/505* (2013.01); *H01M 4/525* (2013.01); *H01M 4/5825* (2013.01)

(58) Field of Classification Search
CPC ...... H01M 4/366; H01M 4/139; H01M 4/505; H01M 4/525; H01M 4/5805; H01M 4/5815; H01M 4/5825; H01M 4/62
See application file for complete search history.

(56) References Cited

U.S. PATENT DOCUMENTS 4,015,054 A * 3/1977 Cleaver ................. H01M 10/39
                                            429/104
6,558,844 B2   5/2003 Howard et al.
(Continued)

FOREIGN PATENT DOCUMENTS

CN    101504994      8/2009
JP    04-315775 A   11/1992
(Continued)

OTHER PUBLICATIONS

Machine translation of JP 2011-233246 A.*
(Continued)

*Primary Examiner* — Jonathan G Jelsma
(74) *Attorney, Agent, or Firm* — Lee & Morse, P.C.

(57) ABSTRACT

A composite cathode active material, a method of preparing the composite cathode active material, and a cathode and a lithium battery each including the composite cathode active material. The composite cathode active material includes a core including a lithium intercalatable oxide which enables intercalation and deintercalation of lithium; and a coating layer disposed on at least a portion of the core, wherein the conductive layer includes a lithium metal oxide which is an inactive lithium ion conductor, and wherein the lithium metal oxide contains a metal which has an atomic weight of 27 Daltons or more and is selected an element of Groups 3 to 14 of the Periodic Table of the Elements.

19 Claims, 6 Drawing Sheets

(51) Int. Cl.
   *H01M 4/62* (2006.01)
   *H01M 4/505* (2010.01)
   *H01M 4/525* (2010.01)
   *H01M 4/58* (2010.01)

(56) References Cited

U.S. PATENT DOCUMENTS

| | | | |
|---|---|---|---|
| 6,770,176 B2 | 8/2004 | Benson et al. | |
| 7,927,506 B2 | 4/2011 | Park | |
| 2002/0141937 A1* | 10/2002 | Howard, Jr. | H01M 4/131 423/599 |
| 2004/0058237 A1* | 3/2004 | Higuchi | H01M 6/188 429/209 |
| 2008/0020283 A1* | 1/2008 | Miyashiro | B82Y 30/00 429/322 |
| 2011/0111298 A1* | 5/2011 | Lopez | H01M 4/131 429/221 |
| 2012/0052396 A1* | 3/2012 | Tsuchida | H01M 4/131 429/304 |
| 2012/0140378 A1* | 6/2012 | Tan | H01G 11/02 361/500 |
| 2012/0258367 A1* | 10/2012 | Jung | H01B 1/122 429/231.1 |
| 2013/0071756 A1* | 3/2013 | Yada | H01B 1/06 429/317 |
| 2013/0260258 A1* | 10/2013 | Tsuchida | H01M 4/131 429/304 |
| 2014/0057180 A1* | 2/2014 | Iwasaki | H01M 4/366 429/304 |

FOREIGN PATENT DOCUMENTS

| | | | | |
|---|---|---|---|---|
| JP | 2003-068302 A | | 3/2003 | |
| JP | 2008027581 A | * | 2/2008 | |
| JP | 2008-300180 A | | 12/2008 | |
| JP | 2011-233246 A | | 11/2011 | |
| KR | 2003-0072386 | | 9/2003 | |
| KR | 1020070091182 A | | 9/2007 | |
| KR | 10-2008-0031616 | | 4/2008 | |
| KR | 1020110063335 A | | 6/2011 | |
| KR | 1020110133418 A | | 12/2011 | |
| WO | WO 2011128977 A1 | * | 10/2011 | H01B 1/06 |

OTHER PUBLICATIONS

Machine translation of JP 2008-27581 A. (Year: 2008).*
Kannno et al., "Structure and Lithiation Mechanism of the Spinel, LiCuVo4", Solid State Ionics, 10/41, 1990, pp. 576-579.
Storey et al, "Electrochemical characterization of a new high capacity cathode", Journal of Power Sources, 97-98, 2001, pp. 541-544.
Korean Office Action dated Aug. 30, 2018.
Zhang et al. Enhanced Electrolchemical Performance, etc, Solid State Ionics, 218 (2012) 31-34.
Korean Notice of Allowance dated Feb. 26, 2019.

* cited by examiner

COMPOSITE CATHODE ACTIVE MATERIAL, METHOD OF PREPARING THE COMPOSITE CATHODE ACTIVE MATERIAL, AND CATHODE AND LITHIUM BATTERY EACH INCLUDING THE COMPOSITE CATHODE ACTIVE MATERIAL

CROSS-REFERENCE TO RELATED APPLICATIONS

This application claims priority to and the benefit of Korean Patent Application No. 10-2012-0119294, filed on Oct. 25, 2012, and all the benefits accruing therefrom under 35 U.S.C. § 119, the content of which is incorporated herein in its entirety by reference.

BACKGROUND

1. Field

The present disclosure relates to a composite cathode active material, methods of preparing the composite cathode active material, and a cathode and a lithium battery, each including the composite cathode active material.

2. Description of the Related Art

For use in small and high-performance devices, high energy density is regarded as an important factor for lithium batteries, in addition to small-size and light-weight characteristics. To provide high energy density, high-voltage and high-capacity lithium batteries are desirable.

To provide a lithium battery providing such characteristics, research into high voltage and high capacity cathode active materials is being performed.

Currently available high-voltage and high-capacity cathode active materials cause side reactions with an electrolyte solution during charge and discharge, and lead to the production of undesirable by-products, such as a transition metal or a gas generated from the cathode active material. Due to the side reaction of cathode active material and the by-products generated therefrom, battery performance may deteriorate.

Accordingly, there remains a need to develop a method of preventing the deterioration in performance of batteries including a high-voltage and high-capacity cathode active material.

SUMMARY

Provided is a composite cathode active material that prevents deterioration of performance of batteries at high temperature and/or a high voltage.

Provided is a cathode including the composite cathode active material.

Provided is a lithium battery including the cathode.

Provided are methods of preparing the composite cathode active material.

Additional aspects will be set forth in part in the description which follows and, in part, will be apparent from the description.

According to an aspect, a composite cathode active material includes: a core including a lithium intercalatable oxide which enables intercalation and deintercalation of lithium; and a coating layer disposed on at least a portion of the core, wherein the coating layer includes a lithium metal oxide which is an inactive lithium ion conductor, and wherein the lithium metal oxide contains a metal which has an atomic weight of 27 Daltons or more and is an element of Groups 3 to 14 of the Periodic Table of the Elements.

According to another aspect, a cathode includes the composite cathode active material described above.

According to another aspect, a lithium battery includes the cathode described above.

According to another aspect, a method of preparing a composite cathode active material includes combining a lithium metal oxide which is an inactive lithium ion conductor, and a lithium intercalatable oxide to form a coating layer comprising the lithium metal oxide on a core particle, which comprises the lithium intercalatable oxide, to manufacture the composite cathode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
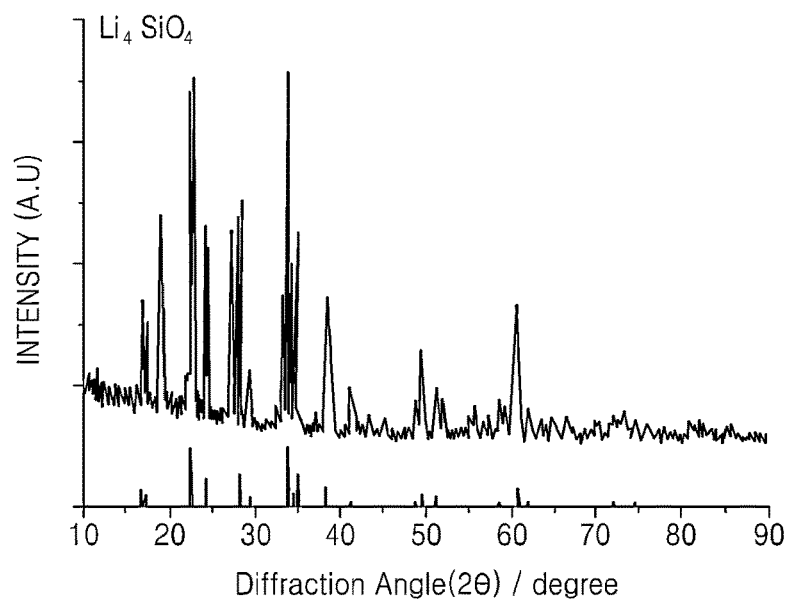
FIG. 1A is a graph of intensity (arbitrary units, a.u.) versus diffraction angle (degrees two-theta, 2θ) which shows an X-ray diffraction ("XRD") spectrum of $Li_4SiO_4$ prepared according to Preparation Example 1.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described, by referring to the figures, to explain aspects of the present description. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Rare earth" means the fifteen lanthanide elements, i.e., atomic numbers 57 to 71, plus scandium and yttrium.

A first charge specific capacity is defined as a specific capacity determined versus lithium metal using a non-aqueous electrolyte by charging a material to 4.7 volts versus lithium.

Hereinafter, a composite cathode active material, methods of preparing the composite cathode active material, and a cathode and a lithium battery, each including the composite cathode active material, are disclosed in further detail.

A composite cathode active material according to an embodiment includes a core comprising a lithium intercalatable oxide which enables intercalation and deintercalation of lithium; and a coating layer disposed on at least a portion of the core, wherein the coating layer comprises a lithium metal oxide which is an inactive lithium ion conductor, and wherein the lithium metal oxide contains a metal which has an atomic weight of 27 Daltons or more and is an element of Groups 3 to 14 of the Periodic Table of the Elements. For example, a composite cathode active material according to an embodiment includes a core comprising a lithium intercalatable oxide which enables intercalation and deintercalation of lithium, and a coating layer (or conductive layer) formed on at least a portion of the core, wherein the conductive layer comprises a lithium metal oxide that is a lithium ion conductor, and wherein the lithium metal oxide contains a metal that has an atomic weight of 27 Daltons (Da) or more and is an element of Groups 3 to 14 of the Periodic Table of the Elements. The lithium metal oxide has an ionic conductivity of at least than $10^{-6}$ Siemens per centimeter, and is substantially non-intercalatable, i.e., has a first charge specific capacity of less than 50 milliampere-hours per gram. For example, the core may comprise an overlithiated or a non-overlithiated layered compound, a spinel compound, an olivine compound, or a combination thereof.

Since the coating layer formed on the core includes the lithium metal oxide that is inactive with respect to an electrode reaction and is a lithium ion conductor, and while not wanting to be bound by theory, it is understood that a side reaction, which may be caused by a transfer of electron between the core and an electrolytic solution may be suppressed. For example and while not wanting to be bound by theory, it is understood that because the lithium metal oxide effectively does not intercalate or deintercalate lithium, the lithium metal oxide is not related to battery capacity, and accordingly, the coating layer including the lithium metal oxide may act as a protective layer for the core. Accordingly, and while not wanting to be bound by theory, it is understood that the coating layer may suppress an undesirable side reaction, such as decomposition of an electrolyte. In addition, the coating layer may prevent the elution of transition metal from the core, which provides intercalation and deintercalation of lithium.

In particular, since the lithium metal oxide is a lithium ion conductor, unlike insulators, the lithium metal oxide does not substantially decrease lithium ion conductivity of the composite cathode active material. Accordingly, charging and discharging efficiency, high-rate characteristics, and high-temperature lifespan characteristics of lithium batteries including the composite cathode active material may be improved.

Thus the lithium metal oxide is a lithium ion conductor and is inactive or inert to an electrode reaction, e.g., a faradaic reaction.

Figure 1B:
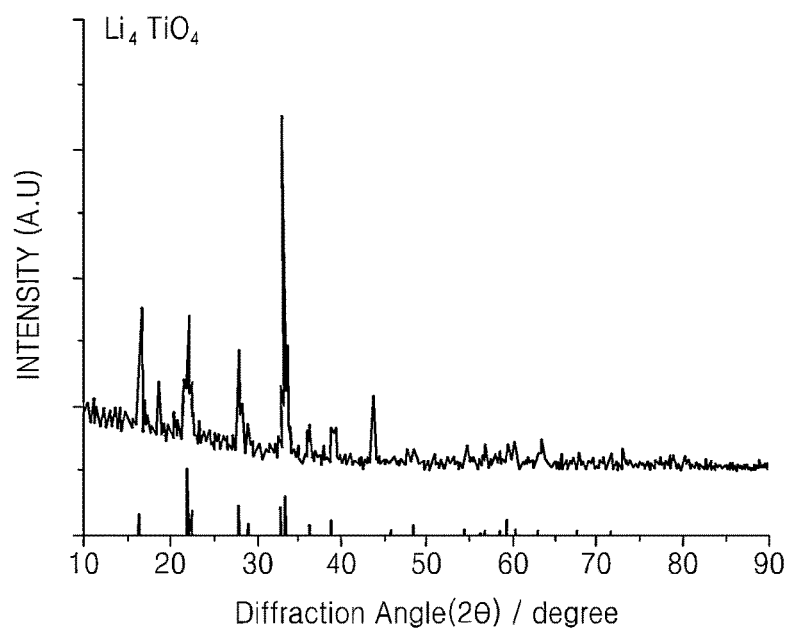
FIG. 1B is a graph of intensity (a.u.) versus diffraction angle (2θ) which shows an XRD spectrum of $Li_4TiO_4$ prepared according to Preparation Example 2.
Figure 1C:
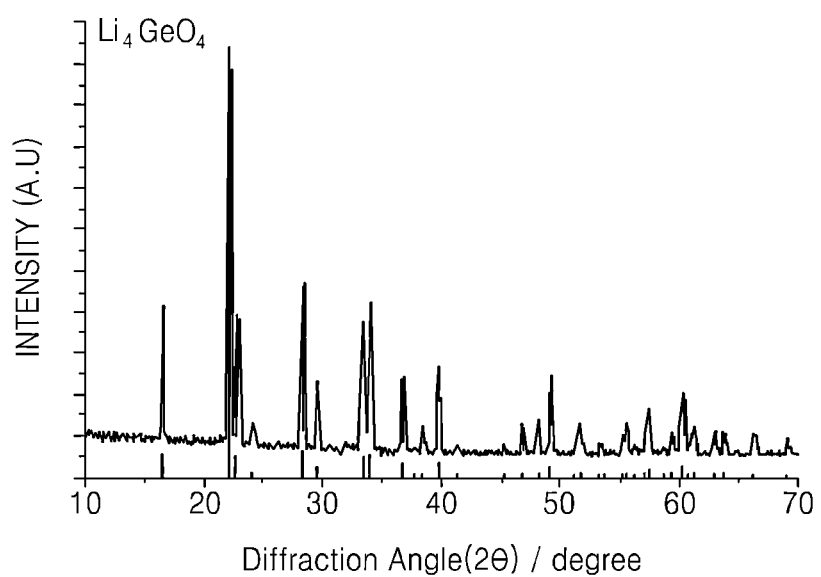
FIG. 1C is a graph of intensity (a.u.) versus diffraction angle (2θ) which shows an XRD spectrum of $Li_4GeO_4$ prepared according to Preparation Example 3.

The lithium metal oxide may have high crystallinity. The lithium metal oxide may have a crystallinity of 50 percent (%) to 99.9%, specifically 60% to 95%, more specifically 70% to 80%, when determined by X-ray diffraction analysis. The crystallinity of the lithium metal oxide may be determined by analysis a peak width of a diffraction peak, e.g., a peak in an X-ray diffraction (XRD) spectrum obtained by using a Cu-Kα ray. The diffraction peaks of the lithium metal oxide may be sharper than peaks of a lithium metal oxide having a low degree of crystallinity. While not wanting to be bound by theory, it is understood that because the lithium metal oxide has a high degree of crystallinity, stability of an electrode active material at high voltage may be improved. For example, FIGS. 1A to 1C show XRD spectra of the lithium metal oxide.

For example, the lithium metal oxide may be represented by Formula 1:

$$Li_xMO_y \qquad \text{Formula 1}$$

wherein 4≤x≤6, 4≤y≤6, and M is Sc, Y, Ti, Zr, Hf, V, Nb, Ta, Cr, Mo, W, Mn, Tc, Re, Fe, Ru, Os, Co, Rh, Ir, Ni, CU, Zn, Ga, In, Tl, Si, Ge, Sn, or Pb.

For example, the lithium metal oxide may be represented by Formula 2:

$$Li_4MO_4 \qquad \text{Formula 2}$$

wherein M is Si, Ge, Ti, Mo, Zn, V, Cr, Mn, Fe, Co, Ni, Cu, Ga, Zr, Nb, Tc, Ru, Rh, Pd, Ag, Cd, Sn, W, or Hf.

In detail, the lithium metal oxide may be at least one of $Li_4SiO_4$, $Li_4TiO_4$, or $Li_4GeO_4$.

The lithium metal oxide included in the composite cathode active material may have an ionic conductivity that is $10^{-9}$ Siemens per centimeter (S/cm) to $10^{-6}$ S/cm, specifically $5 \cdot 10^{-9}$ S/cm to $5 \cdot 10^{-7}$ S/cm, more specifically $10^{-8}$ S/cm to $10^{-7}$ S/cm, at a temperature of 100° C. In an embodiment, the lithium metal oxide included in the composite cathode active material may have a lithium ion conductivity that is $10^{-9}$ Siemens per centimeter (S/cm) to $10^{-6}$ S/cm, specifically $5 \cdot 10^{-9}$ S/cm to $5 \cdot 10^{-6}$ S/cm, more specifically $10^{-8}$ S/cm to $10^{-7}$ S/cm, at a temperature of 100° C. The lithium metal oxide may have a lithium ion conductivity that is greater than a lithium ion conductivity of alumina, magnesium dioxide, zinc oxide, zinc fluoride, or magnesium fluoride, which do not have substantial lithium ion conductivity. For example, $Li_4SiO_4$ and $Li_4GeO_4$ each have a lithium ion conductivity of $10^{-7}$ S/cm or less at a temperature of 100° C. Since the lithium metal oxide has a greater lithium ion conductivity than an insulator that does not have substantial lithium ion conductivity, a lithium battery including the lithium metal oxide may have improved high-rate characteristics.

The lithium metal oxide included in the composite cathode active material may be effectively inactive with respect to lithium intercalation. "Inactive" as used herein means that the lithium metal oxide may has a first charge specific capacity of 50 milliampere-hours per gram (mAh/g) or less, specifically 0 to 25 mAh/g, more specifically 0 mAh/g to 15 mAh/g, even more specifically 0 mAh/g to 5 mAh/g. Determination of the $1^{st}$ specific capacity may be determined versus lithium metal using a non-aqueous electrolyte by charging to 4.7 volts versus lithium.

An amount of the lithium metal oxide included in the coating layer of the composite cathode active material may be 5 weight percent (wt %) or less, based on the total weight of the composite cathode active material. For example, an amount of the lithium metal oxide included in the coating layer may be greater than 0 to 4 wt %, based on the total weight of the composite cathode active material. For example, an amount of the lithium metal oxide included in the coating layer may be greater than 0 to 3 wt %, based on the total weight of the composite cathode active material, or 0.1 wt % to 5 wt %, or 0.5 wt % to 4.5 wt %, or 1 wt % to 4 wt %, based on the total weight of the composite cathode active material. For example, an amount of the lithium metal oxide included in the coating layer may be greater than 0 to 2 wt %, based on the total weight of the composite cathode active material. For example, an amount of the lithium metal oxide included in the coating layer may be greater than 0 to 1 wt %, based on the total weight of the composite cathode active material. Within such ranges, improved battery characteristics may be obtained.

When determined by X-ray photoelectron analysis of a surface of the lithium metal oxide, a metal content of the lithium metal oxide with respect to the entire surface composition of the composite cathode active material may be 8 atomic percent (atom %) or less. For example, by X-ray photoelectron analysis, a metal content of the lithium metal oxide may be greater than 0 to 7.8 atom %. For example, by X-ray photoelectron analysis, a metal content of the lithium metal oxide may be greater than 0 to 5 atom %. For example, by X-ray photoelectron analysis, a metal content of the lithium metal oxide may be greater than 0 to 3 atom %, or 0.1 atom % to 8 atom %, or 0.5 atom % to 7 atom %, or 1 atom % to 6 atom %, based on an entire surface composition of the composite cathode active material. Within such amount ranges, improved battery characteristics may be obtained.

For example, the core in the composite cathode active material may comprise at least one of an overlithiated layered compound, a spinel compound, or an olivine compound.

For example, the core may include a compound represented by Formula 3:

$$pLi_2MO_3\text{-}(1-p)LiMeO_2 \qquad \text{Formula 3}$$

wherein 0<p≤0.8, M is at least one metal of Ru, Rh, Pd, Os, Ir, Pt, Mg, Ca, Sr, Ba, Ti, Zr, Nb, Mo, W, Zn, Al, Si, Ni, Mn, Cr, Fe, Mg, Sr, V, or a rare earth element, and Me is at least one of Ti, V, Cr, Mn, Fe, Co, Ni, Cu, Al, Mg, Zr, or B.

For example, the core may include a compound represented by Formula 4:

$$Li[Li_xMe_y]O_{2+d} \qquad \text{Formula 4}$$

wherein x+y=1, 0<x<1, 0≤d≤0.1, and Me is at least one metal of Mn, V, Cr, Fe, Co, Ni, Zr, Re, Al, B, Ge, Ru, Sn, Ti, Nb, Mo, or Pt.

For example, the core may include a compound represented by Formula 5:

$$Li[Li_xNi_aCo_bMn_c]O_{2+d} \qquad \text{Formula 5}$$

wherein x+a+b+c=1, 0<x<1, 0<a<1, 0<b<1, 0<c<1, and 0≤d≤0.1.

Some or all of one atom of Ni, Co, or Mn in Formula 5 may be substituted with Al.

For example, the core may include a compound represented by Formula 6:

$$pLi_2MnO_3\text{-}(1-p)LiNi_aCo_bMn_cO_2 \qquad \text{Formula 6}$$

wherein 0<p<1, 0<a<1, 0<b<1, 0<c<1, and a+b+c=1.

For example, the core may include a compound represented by Formula 7:

$$xLi_2MO_3\text{-}yLiMeO_2\text{-}zLi_{1+d}M'_{2-d}O_4 \quad \text{Formula 7}$$

wherein x+y+z=1; 0<x<1, 0<y<1, 0<z<1; 0≤d≤0.33, M is at least one metal of Mg, Ca, Sr, Ba, Ti, Zr, Nb, Mo, W, Zn, Al, Si, Ni, Mn, Cr, Fe, Mg, Sr, V, or a rare earth element, Me is at least one metal of Ti, V, Cr, Mn, Fe, Co, Ni, Cu, Al, Mg, Zr, or B, and M' is at least one metal of Ti, V, Cr, Mn, Fe, Co, Ni, Cu, Al, Mg, Zr, or B.

For example, the core may include a compound represented by one of Formula 8 to 12:

$$Li_xCo_{1-y}M_yO_{2-a}X_a \quad \text{Formula 8}$$

$$Li_xCo_{1-y-z}Ni_yM_zO_{2-a}X_a \quad \text{Formula 9}$$

$$Li_xMn_{2-y}M_yO_{4-a}X_a \quad \text{Formula 10}$$

$$Li_xCO_{2-y}M_yO_{4-a}X_a \quad \text{Formula 11}$$

$$Li_xMe_yM_zPO_{4-a}X_a \quad \text{Formula 12}$$

wherein in Formulas 8 to 12, 0.90≤x≤1.1, 0≤y≤0.9, 0≤z≤0.5, 1-y-z>0, 0≤α≤2, Me is at least one metal of Ti, V, Cr, Mn, Fe, Co, Ni, Cu, Al, Mg, Zr, or B, M is at least one metal of Mg, Ca, Sr, Ba, Ti, Zr, Nb, Mo, W, Zn, Al, Si, Ni, Mn, Cr, Fe, Mg, Sr, V, or a rare earth element, and X is at least one metal of O, F, S, or P.

For example, the core may comprise a compound having an olivine structure represented by Formula 13:

$$Li_xM_yM'_zPO_{4-d}X_d \quad \text{Formula}$$

wherein 0.9≤x≤1.1, 0<y≤1, 0≤z≤1, 1.9≤x+y+z≤2.1, 0≤d≤0.2; M is at least one of Fe, Mn, Ni, or Co; M' is at least one of Mg, Ca, Sr, Ba, Ti, Zr, Nb, Mo, W, Zn, Al, or Si; and X is at least one of S or F.

For example, the core may include at least one of $LiCoO_2$, $LiFePO_4$, $LiFe_{1-a}Mn_aPO_4$ (0<a<1), or $LiMnPO_4$.

A thickness of the coating layer in the composite cathode active material may be in a range of about 1 nanometer (nm) to about 1 micrometer (μm). For example, a thickness of the coating layer may be in a range of about 2 nm to about 500 nm. For example, a thickness of the coating layer may be in a range of about 4 nm to about 100 nm. For example, a thickness of the coating layer may be in a range of about 1 nm to about 30 nm. For example, a thickness of the coating layer may be in a range of about 5 nm to about 15 nm. Within such thickness ranges of the coating layer, a lithium battery with improved properties may be provided.

The core in the composite cathode active material may be particles having an average particle size of about 10 nm to about 500 μm. For example, an average particle size of the core may be in a range of about 10 nm to about 100 μm. For example, an average particle size of the core may be in a range of about 10 nm to about 50 μm. For example, an average particle size of the core may be in a range of about 1 μm to about 30 μm. Within such ranges of the core average particle diameter, a lithium battery with improved properties may be provided.

A cathode according to an embodiment may comprise the composite cathode active material.

An example of a method of manufacturing a cathode is disclosed as follows. The composite cathode active material, a conductive material, a binding agent, and a solvent are combined to prepare a cathode active material composition, and the cathode active material composition may be directly coated on an aluminum current collector and dried to form a cathode plate including a cathode active material layer, or the cathode active material composition may be cast on a separate support, and then a film exfoliated from the support and laminated onto the aluminum current collector to prepare a cathode plate including a cathode active material layer.

Examples of the conductive material are carbon black, graphite particulate, natural graphite, artificial graphite, acetylene black, KETJEN black, carbon fiber, carbon nanotube, a metal powder or metal fiber or metal tube such as copper, nickel, aluminum, or silver, or a conductive polymer, such as polyphenylene derivative, but the conductive material is not limited thereto and may be any suitable conductive material that is used in the art.

As a binding agent, at least one of a vinylidene fluoride/hexafluoropropylene copolymer, polyvinylidenefluoride, polyacrylonitrile, polymethylmetacrylate, polytetrafluoroethylene (PTFE), or a styrene butadiene rubber-based polymer may be used, and as a solvent, N-methylpyrrolidone ("NMP"), acetone, water, or the like may be used, and the solvent is not limited thereto and may be any suitable material that is used in the art.

If desired, a plasticizer may be further added to the cathode active material composition to form pores in an electrode plate.

Amounts of the composite cathode active material, the conductive agent, the binding agent, and the solvent may be the same as those used in a commercial lithium battery. According to the purpose and structure of a lithium battery, one or more of the conductive agent, the binding agent, and the solvent may be omitted.

n addition, the cathode may further include, in addition to the composite cathode active material, a second cathode active material.

For use as the second cathode active material, any suitable lithium-containing metal oxide according to the related art may be used. For example, at least one composite oxide of lithium and at least one metal of cobalt, manganese, or nickel may be used, and detailed examples thereof are compounds represented by any one of $Li_aA_{1-b}Q_bD_2$ (wherein 0.90≤a≤1, and 0≤b≤0.5); $Li_aE_{1-b}Q_bO_{2-c}D_c$ (wherein 0.90≤a≤1, 0≤b≤0.5, and 0≤c≤0.05); $LiE_{2-b}Q_bO_{4-c}D_c$ (wherein 0≤b≤0.5, and 0≤c≤0.05); $Li_aNi_{1-b-c}Co_bQ_cD_\alpha$ (wherein 0.90≤a≤1, 0≤b≤0.5, 0≤c≤0.05, and 0<α≤2); $Li_aNi_{1-b-c}Co_bQ_cO_{2-\alpha}F_\alpha$ (wherein 0.90≤a≤1, 0≤b≤0.5, 0≤c≤0.05, and 0<α<2); $Li_aNi_{1-b-c}Co_bQ_cO_{2-\alpha}F_\alpha$ (wherein 0.90≤a≤1, 0≤b≤0.5, 0≤c≤0.05, and 0<α<2); $Li_aNi_{1-b-c}Mn_bQ_cD_\alpha$ (wherein 0.90≤a≤1, 0≤b≤0.5, 0≤c≤0.05, and 0<α≤2); $Li_aNi_{1-b-c}Mn_bQ_cO_{2-\alpha}F_\alpha$ (wherein 0.90≤a≤1, 0≤b≤0.5, 0≤c≤0.05, and 0<α<2); $Li_aNi_{1-b-c}Mn_bQ_cO_{2-\alpha}F_2$ (wherein 0.90≤a≤1, 0≤b≤0.5, 0≤c≤0.05, and 0<α<2); $Li_aNi_bE_cG_dO_2$ (wherein 0.90≤a≤1, 0≤b≤0.9, 0≤c≤0.5, and 0.001≤d≤0.1)); $Li_aNi_bCo_cMn_dGeO_2$ (wherein 0.90≤a≤1, 0≤b≤0.9, 0≤c≤0.5, 0≤d≤0.5, and 0.001≤e≤0.1)); $Li_aNiG_bO_2$ (wherein 0.90≤a≤1, and 0.001≤b≤0.1)); $Li_aCoG_bO_2$ (wherein 0.90≤a≤1, and 0.001≤b≤0.1)); $Li_aMnG_bO_2$ (wherein 0.90≤a≤1, and 0.001≤b≤0.1)); $Li_aMn_2G_bO_4$ (wherein 0.90≤a≤1, and 0.001≤b≤0.1)); $LiQ'S_2$; $LiV_2O_5$; $LiQ"O_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the formulas above, A is at least one of Ni, Co, or Mn; Q is at least on of Al, Ni, Co, Mn, Cr, Fe, Mg, Sr, V, or a rare-earth element; D is at least one of O, F, S, or P; E is at least one of Co, or Mn; F is at least one of F, S, or P; G is at least one of Al, Cr, Mn, Fe, Mg, La, Ce, Sr, or V; Q' is at least one of Ti, Mo, or Mn; Q" is at least one of Cr, V, Fe, Sc, or Y; and J is at least one of V, Cr, Mn, Co, Ni, or Cu.

For example, compounds represented by $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ (0≤x≤0.5, 0≤y≤0.5), and $FePO_4$ may be used.

The second cathode active material may have a conductive layer on a surface thereof, or the second cathode active material may be combined with a compound having a conductive layer. The coating layer may include an oxide of a coating element, a hydroxide of a coating element, an oxyhydroxide of a coating element, an oxycarbonate of a coating element, or a hydroxycarbonate of a coating element. These compounds that form the conductive layer may be amorphous or crystalline. As a coating element included in the conductive layer at least one of Mg, Al, Co, K, Na, Ca, Si, Ti, V, Sn, Ge, Ga, B, As, or Zr may be used. The conductive layer may be formed using any suitable coating method that may be performed using the compounds and does not affect desirable properties of the cathode active material (for example, spray coating, immersion, or the like). Further details of these coating methods can be determined by one of skill in the art without undue experimentation, and thus are not described in further detail herein.

A lithium battery according to an embodiment includes a cathode including the composite cathode active material. The lithium battery may be manufactured by using the following method.

First, a cathode may be manufactured using the cathode manufacturing method described above.

Then, an anode may be manufactured in the following manner. The anode may be manufactured in the same manner as used to manufacture the cathode, except that an anode active material is used instead of the composite cathode active material. In addition, a conductive material, a binding agent, and a solvent used in an anode active material composition may be the same as those used in the cathode.

For example, an anode active material, a conductive material, a binding agent, and a solvent may be combined to prepare an anode active material composition, and the anode active material composition may be directly coated on a copper current collector to manufacture an anode plate. According to another embodiment, the anode active material composition may be cast on a separate support, and an anode active material film exfoliated from the support and laminated on a copper current collector to manufacture an anode plate.

In addition, the anode active material may be any suitable material that is used as an anode active material for a lithium battery in the art. For example, the anode active material may comprise at least one of lithium metal, a lithium-alloyable metal, a transition metal oxide, a non-transition metal oxide, or a carbonaceous material.

For example, the lithium-alloyable metal may comprise Si, Sn, Al, Ge, Pb, Bi, Sb Si—Y alloy (wherein Y is at least one of an alkali metal, an alkali earth metal, a Group 13 element, a Group 14 element, transition metal, or rare earth element and not Si), or a Sn—Y alloy (wherein Y is at least one of an alkali metal, alkali earth metal, a Group 13 element, a Group 14 element, transition metal, or a rare earth element and not Sn). The element Y may be at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, or Po.

For example, the transition metal oxide may be titanium oxide, a vanadium oxide, or a lithium vanadium oxide.

For example, the transition metal oxide may be $SnO_2$, $SiO_x$ (0<x<2), or the like.

The carbonaceous material may be at least one of a crystalline carbon or an amorphous carbon. The crystalline carbon may be natural or artificial graphite that is amorphous, tabular, flake, circular, or fibrous, and the amorphous carbon may be a soft carbon (e.g., cold calcined carbon), or a hard carbon, meso-phase pitch carbide, or calcined cork.

Amounts of the anode active material, the conductive agent, the binding agent, and the solvent may be the same as is used in commercial lithium batteries.

Then, a separator which is to be inserted between the cathode and the anode is provided. As a separator, any suitable material that is used in a lithium battery may be used. A material for forming the separator may be a material that has a low resistance to ion migration of an electrolyte and has excellent electrolytic solution retaining capability. For example, the separator forming material may be at least one of glass fiber, polyester, Teflon, polyethylene, polypropylene, or polytetrafluoroethylene ("PTFE"), each of which may be in the form of a non-woven fabric or a woven fabric. For example, for use in a lithium ion battery, a rollable separator comprising polypropylene may be used, and for use in a lithium ion polymer battery, a separator that has excellent organic electrolytic solution-retaining capability may be used. For example, these separators may be prepared by using the following method.

A separator composition is prepared by combining a polymer resin, a filler, and a solvent. The separator composition may be directly coated or dried on an electrode to complete the formation of the separator. Alternatively, the separator composition may be cast on a separate support and then a film separated from the support is laminated on an electrode, thereby completing the formation of the separator.

A polymer resin used in preparing the separator may not be particularly limited, and any suitable materials used for a binding agent of an electrode plate may be used. For example, at least one of a vinylidene fluoride/hexafluoropropylene copolymer, polyvinylidene fluoride ("PVDF"), polyacrylonitrile, or polymethylmetacrylate may be used.

Then, an electrolyte is prepared.

For example, the electrolyte may be an organic electrolytic solution. According to an embodiment, the electrolyte may be solid. For example, boron oxide, lithiumoxynitride, or the like may be used, but the electrolyte may not be limited thereto, and the electrolyte may be any suitable material that is used as a solid electrolyte in the art. The solid electrolyte may be formed on an anode by, for example, sputtering.

For example, an organic electrolytic solution may be prepared. The organic electrolytic solution may be prepared by dissolving a lithium salt in an organic solvent.

The organic solvent may comprise any suitable material that is used as an organic solvent in the art. For example, the organic solvent may comprise at least one of propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, or dimethylether.

The lithium salt may comprise any suitable lithium salt used in the art. Examples of the lithium salt are at least one of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, or LiI.

Figure 4:
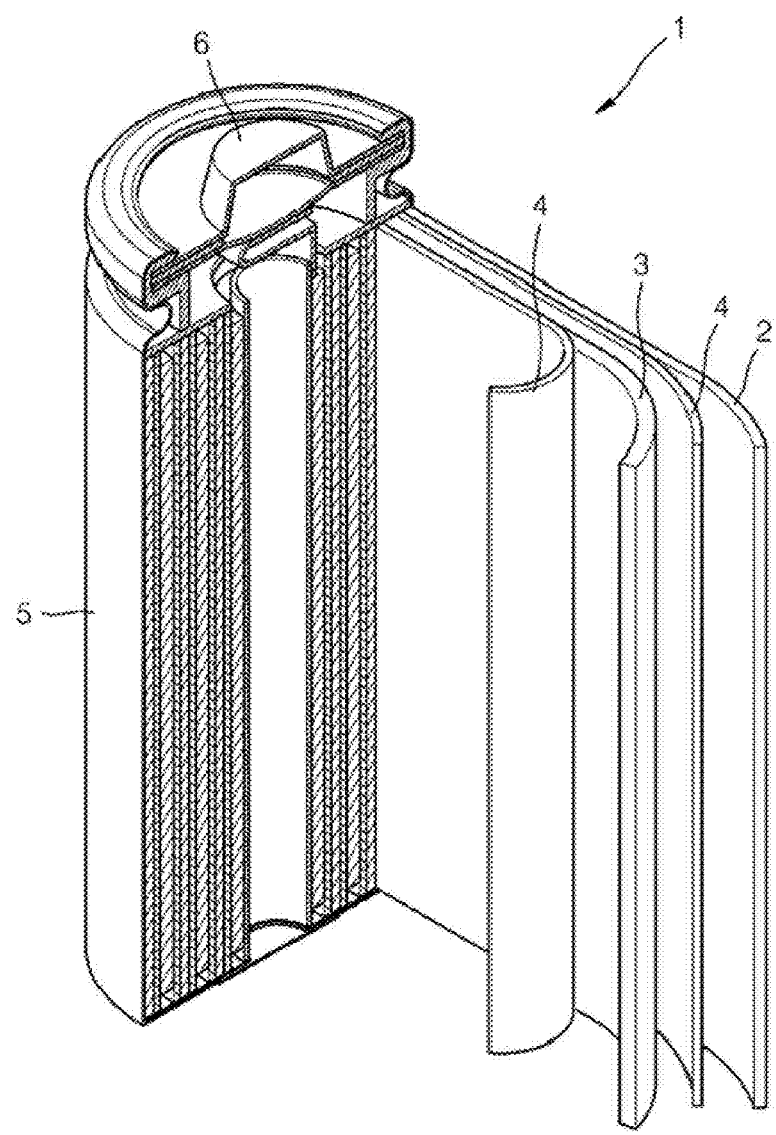
FIG. 4 is a schematic view of an embodiment of a lithium battery.

Referring to FIG. 4, a lithium battery 1 includes a cathode 3, an anode 2, and a separator 4. The cathode 3, the anode 2, and the separator 4 are wound or folded to be placed in a battery case 5. Subsequently, an organic electrolytic solution is disposed, e.g., injected, into the battery case 5, and the resulting structure is sealed with a cap assembly 6, thereby completing the manufacturing of the lithium battery 1. The battery case 5 may be cylindrical, rectangular, or a thin-film shape. For example, the lithium battery may be a large thin film-type battery. The lithium battery may be a lithium ion battery.

A separator may be interposed between the cathode and the anode to form a battery assembly. A plurality of battery assemblies may be stacked in a bi-cell structure and then impregnated with an organic electrolytic solution, and then housed in a pouch, followed by sealing, thereby completing the manufacture of a lithium ion polymer battery.

Also, a plurality of the battery assemblies may be stacked to form a battery pack, and the battery pack may be used in a device to provide high capacity and high power output. For example, the battery assembly may be used in a notebook computer, a smartphone, an electric vehicle, or the like.

In addition, the lithium battery may be used in an electric vehicle ("EV") due to its lifetime characteristics and high-rate characteristics. For example, the lithium battery may be used in a plug-in hybrid electric vehicles ("PHEV"). In addition, the lithium battery may be used to provide a great amount of electric power. For example, the lithium battery may be used in an electric bicycle, an electric tool, or the like.

A method of preparing the composite cathode active material, according to an embodiment, includes forming a coating layer comprising the lithium metal oxide on a core particle comprising a lithium intercalatable oxide which enables intercalation or deintercalation of lithium.

For example, the coating layer may be formed by a dry method.

When the coating layer is formed by a dry method, the manufacturing method may include mixing a core including an electrode active material comprising a lithium intercalatable oxide which enables intercalation and deintercalation of lithium with the lithium metal oxide that is a lithium ion conductor; and forming a surface-treated layer containing a lithium-free oxide on the core by a dry method.

The dry method includes any suitable method of forming a surface-treated layer by applying mechanical energy to a mixture of a core particle including an electrode active material and a lithium metal oxide particle without a solvent.

The dry method may comprise, for example, a) a method of disposing, e.g., contacting and attaching, a powder of a covering material, for example a lithium metal oxide, on a surface of a core with a low speed ball mill and simultaneously cohering the attached particles to each other to form a coating layer, b) a method of confining and attaching covering material particles on a surface of a core particle by rotation of a grinding media or a rotator disposed in an apparatus, and simultaneously binding the covering material particles mechanically on the core particle by stresses or binding the particles by softening or fusing a coating layer of the covering material particles on the core particle by a heat produced by the stresses, or c) a method of fusing a portion or the entire coating layer and the core by performing a heat treatment on the core covered with the coating layer formed according to the method a) and/or b) and then cooling, but the method is not limited thereto, and any suitable dry process used in the art may be used.

For example, the dry method may be any one method of a ball mill method, a low-speed ball mill method, e.g., a ball mill operating at 500 revolutions per minute ("RPM") to 2000 RPM, a high-speed ball mill method e.g., a ball mill operating at 2000 RPM) to 10,000 RPM, a hybridization method, or a mechanofusion method. For example, the dry method may be a mechanofusion method.

According to the mechanofusion method, a mixture is provided into a vessel that is rotating and then, due to a centrifuging force, the mixture is fixed on an inner wall of the vessel and then, the mixture is compressed in a gap between the inner wall of the vessel and an arm head near the inner wall of the vessel. The mechanofusion method corresponds to the method b).

The dry method may further include heat treating the resulting structure including the coating layer after the formation of the coating layer. Due to the heat treatment, the coating layer may be firmer and/or more stable than before the heat treatment. A heat treatment condition that may fuse a portion or the entire coating layer may be available.

In the method, an amount of the lithium metal oxide may be 5 wt % or less based on the total weight of the core and a lithium metal oxide. For example, an amount of the lithium metal oxide may be in a range of greater than 0 to 4 wt %, based on the total weight of the core and a lithium metal oxide. For example, an amount of the lithium metal oxide may be in a range of greater than greater than 0 to 3 wt %. For example, an amount of the lithium metal oxide may be in a range of greater than 0 to 2 wt %, or 0.1 wt % to 5 wt %, or 0.5 wt % to 4 wt %, based on the total weight of the core and a lithium metal oxide.

According to another embodiment, in the method, a coating layer may be formed by a wet method.

When the coating layer is formed by a wet method, the manufacturing method may include mixing a core containing an electrode active material and a precursor of a lithium metal oxide that is an inactive lithium ion conductor, and forming a coating layer containing a lithium metal oxide on the core by a wet method.

The wet method may include, for example, reducing the precursor in a solution to form a lithium metal oxide on a core.

An embodiment is described in further detail with reference to the following Examples. The Examples are presented herein for illustrative purpose only, and do not limit the scope of the present disclosure.

EXAMPLES

Preparation of Lithium Metal Oxide

Preparation Example 1

$Li_2CO_3$ and $H_2SiO_3$ were mixed at a composition ratio of 2:1, and then, the mixture was calcined at a temperature of 850° C. for 6 hours in the atmospheric condition to prepare $Li_4SiO_4$ that is a lithium ion conductor. Subsequently, $Li_4SiO_4$ was milled using a ball mill for 24 hours to prepare $Li_4SiO_4$ particles having an average particle size of about 250 nanometers (nm).

Preparation Example 2

$Li_2CO_3$ and $TiO_2$ (anatase) were mixed at a composition ratio of 2:1, and then, the mixture was calcined at a temperature of 1000° C. for 4 hours in the nitrogen atmosphere containing 2 weight percent (wt %) hydrogen to prepare $Li_4TiO_4$ that is an inactive and lithium ion conductor. Subsequently, $Li_4TiO_4$ was milled by using a ball mill for 24 hours to prepare $Li_4TiO_4$ particles having an average particle size of about 500 nm.

Preparation Example 3

$Li_2CO_3$ and $GeO_2$ were mixed at a composition ratio of 2:1, and then, the mixture was calcined at a temperature of 700° C. for 20 hours in air to prepare $Li_4GeO_4$ that is an inactive and lithium ion conductor. Subsequently, $Li_4GeO_4$ was milled using a ball mill for 24 hours to prepare $Li_4GeO_4$ particles having an average particle size of about 2000 nm.

Preparation Example 4

$Li_2CO_3$ and $MoO_3$ were mixed at a composition ratio of 2:1, and then, the mixture was calcined at a temperature of 700° C. for 20 hours in the atmospheric condition to prepare $Li_4GeO_4$ that is an inactive and lithium ion conductor. Subsequently, $Li_4MoO_4$ was milled using a ball mill for 24 hours to prepare $Li_4MoO_4$ particles having an average particle size of about 2000 nm.

Preparation of Composite Cathode Active Material

Example 1

Figure 2A:
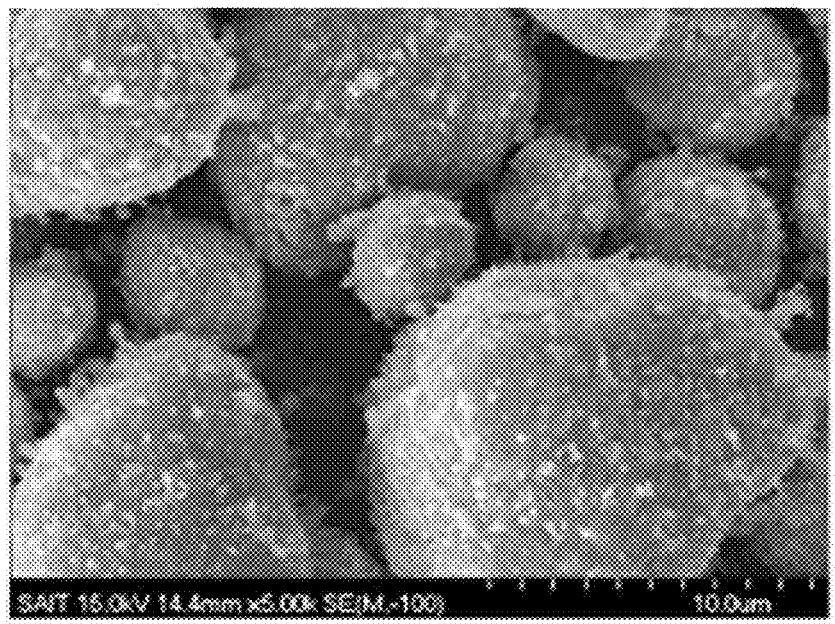
FIG. 2A shows a scanning electron microscopic ("SEM") image of a composite cathode active material prepared according to Example 1.

0.5 parts by weight of $Li_4SiO_4$ particles prepared according to Preparation Example 1 was mixed with 100 parts by weight of $Li_{1.18}Ni_{0.17}Co_{0.1}Mn_{0.56}O_4$ powder having an average particle size of 10 μm. The mixture was treated using a dry surface treatment apparatus (Hosokawa Micron Corporation, Japan, Mechanofusion device, Nobilta-mini) for 20 minutes at a rotational ratio of 3000 rpm to prepare a composite cathode active material in which a coating layer containing $Li_4SiO_4$ was formed on the $Li_{1.18}Ni_{0.17}Co_{0.1}Mn_{0.56}O_4$ core. FIG. 2A shows an image of the composite cathode active material.

Example 2

Figure 2B:
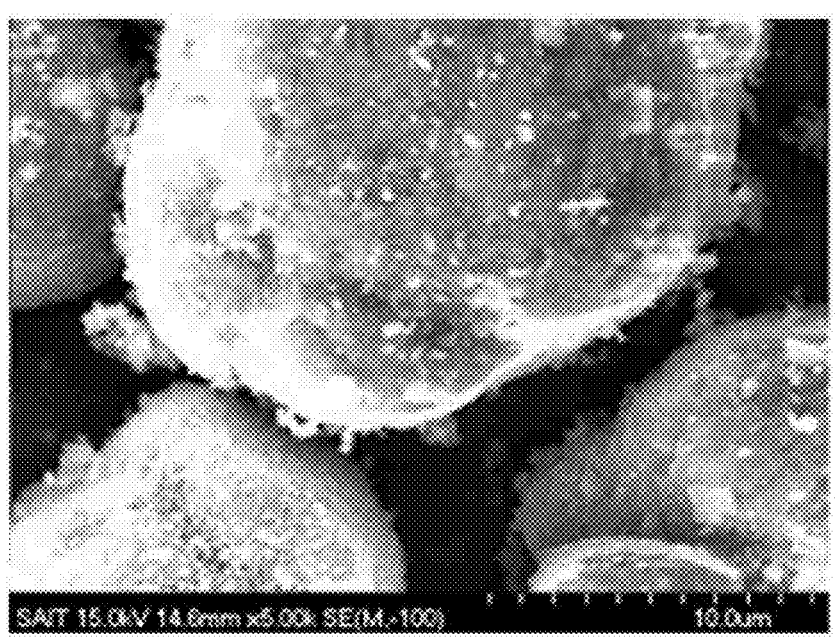
FIG. 2B shows a SEM image of a composite cathode active material prepared according to Example 2.

A composite cathode active material was prepared in the same manner as in Example 1, except that the amount of the $Li_4SiO_4$ particles was 1.0 part by weight.
FIG. 2B shows an image of the composite cathode active material.

Example 3

Figure 2C:
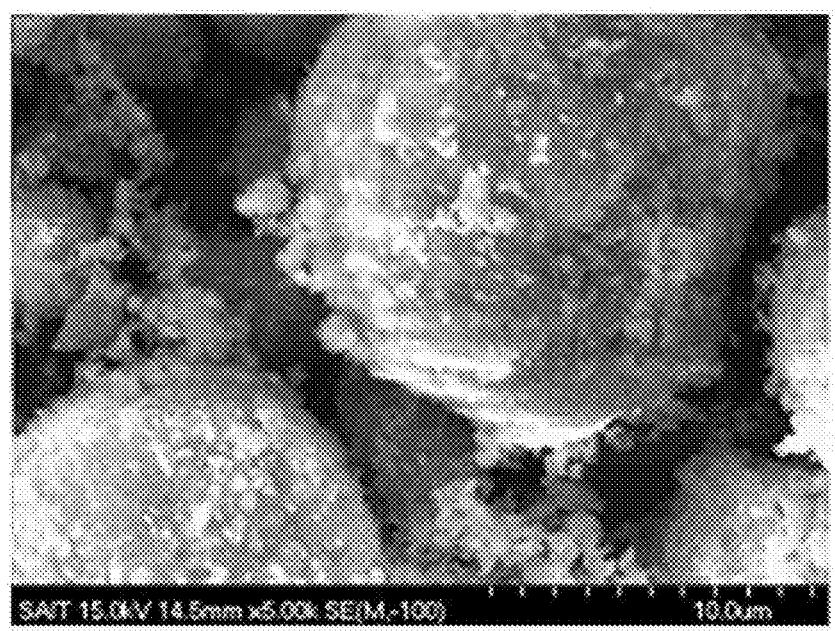
FIG. 2C shows a SEM image of a composite cathode active material prepared according to Example 3.

A composite cathode active material was prepared in the same manner as in Example 1, except that the amount of $Li_4SiO_4$ particles was 3.0 parts by weight.
FIG. 2C shows an image of the composite cathode active material.

Example 4

A composite cathode active material was prepared in the same manner as in Example 1, except that the amount of $Li_4SiO_4$ particles was 5.0 parts by weight.

Example 5

A composite cathode active material was prepared in the same manner as in Example 1, except that $Li_4TiO_4$ particles prepared according to Preparation Example 2 were used instead of $Li_4SiO_4$.

Example 6

A composite cathode active material was prepared in the same manner as in Example 1, except that $Li_4GeO_4$ particles prepared according to Preparation Example 3 were used instead of $Li_4SiO_4$.

Comparative Example 1

Figure 2D:
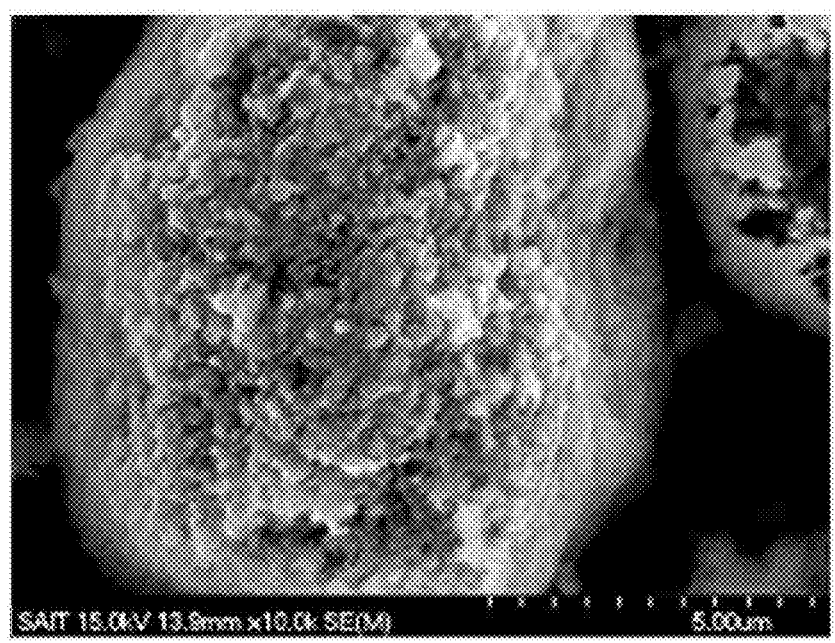
FIG. 2D shows a SEM image of a cathode active material prepared according to Comparative Example 1.

$Li_{1.18}Ni_{0.17}Co_{0.1}Mn_{0.56}O_4$ powder having an average particle size of 10 μm was directly used as a cathode active material without the preparation of the surface-treated layer.
FIG. 2D shows an image of the cathode active material.

Comparative Example 2

0.2 parts by weight of alumina ($Al_2O_3$) particles having an average particle size of 300 nm were mixed with 100 parts by weight of $Li_{1.18}Ni_{0.17}Co_{0.1}Mn_{0.56}O_4$ powder having an average particle size of 10 μm. The mixture was treated by using a dry surface treatment apparatus (Hosokawa Micron Corporation, Japan, Mechanofusion device, Nobilta-mini) for 20 minutes at a rotational ratio of 3000 revolutions per minute ("RPM") to prepare a composite cathode active material in which a coating layer containing $Al_2O_3$ was formed on the $Li_{1.18}Ni_{0.17}Co_{0.1}Mn_{0.56}O_4$ core.

Comparative Example 3

A composite cathode active material was prepared in the same manner as in Comparative Example 2, except that the amount of alumina particles was 1.0 part by weight.

Comparative Example 4

A composite cathode active material was prepared in the same manner as in Comparative Example 2, except that the amount of alumina particles was 1.7 parts by weight.

Preparation of Cathode

Example 7

The composite cathode active material prepared according to Example 1, a carbon coating agent (Denka Black), and polyvinylidenefluoride ("PVdF") were mixed at a weight ratio of 94:3:2, and the mixture was mixed with N-methylpyrrolidone ("NMP") in an agate mortar to prepare slurry. The slurry was coated on a 15 μm-thick aluminum collector by using a doctor blade to a thickness of about 40 μm, and then, the coating layer was dried at room temperature and then dried under a vacuum condition at a temperature of 120° C., and then pressed and punched to manufacture a cathode plate including a cathode active material layer.

Examples 8 to 12

Cathode plates were manufactured in the same manner as in Example 6, except that the composite cathode active materials prepared according to Examples 2 to 6 were used.

Comparative Examples 5 to 8

Cathode plates were manufactured in the same manner as in Example 6, except that the cathode active materials prepared according to Comparative Examples 1 to 4 were used.

Manufacturing of Lithium Battery

Example 13

A coin cell was manufactured using the cathode plate prepared according to Example 7, lithium metal that is a counter electrode, a PTFE separator, and as an electrolyte a solution in which 1.3M LiPF6 was dissolved in a mixed solution of ethylene carbonate ("EC"), diethyl carbonate ("DEC"), and ethylmethyl carbonate ("EMC") at a volumetric ratio of 3:5:2.

Examples 14 to 18

Coin cells were manufactured in the same manner as in Example 13, except that the cathodes manufactured according to Examples 8-12 were used.

Comparative Examples 9 to 12

Coin cells were manufactured in the same manner as in Example 13, except that the cathodes manufactured according to Comparative Examples 5-8 were used.

Evaluation Example 1: XRD Analysis

X-ray diffraction ("XRD") analysis was performed on the $Li_4SiO_4$, $Li_4TiO_4$ and $Li_4GeO_4$ particles prepared according to Preparation Examples 1 to 3, and results thereof are shown in FIGS. 1A to 1C. XRD was measured by using a Cu-Kα ray.

As shown in FIGS. 1A to 1C, the lithium metal oxides show sharp peaks indicating that crystallinity thereof is high.

Evaluation Example 2: XPS Analysis

X-ray photoelectron spectroscopy was performed on surfaces of the cathode active materials prepared according to Examples 1 to 6, and some of results thereof are shown in Table 1. Table 1 shows results of $Li_4SiO_4$ prepared according to Examples 1 to 3.

TABLE 1

| | C 1s [atom %] | O 1s [atom %] | Si 2p [atom %] | Mn 2p [atom %] |
|---|---|---|---|---|
| Example 3 | 12.94 | 69.20 | 7.72 | 10.15 |
| Example 2 | 12.78 | 69.69 | 7.71 | 9.83 |
| Example 1 | 26.69 | 58.37 | 0.97 | 13.97 |

As shown in Table 1, an amount of Si on the surfaces of the composite cathode active materials of Examples 1 to 3 was 8 atomic percent (atom %) or less.

Evaluation Example 3: Evaluation on Characteristics of Batteries

During a $1^{st}$ cycle, the coin cells manufactured according to Examples 13 to 18 and Comparative Examples 9 to 12 were constant-current charged at a rate of 0.1 C until the voltage reached 4.7 V and then, the coin cells were constant-current discharged at a rate of 0.1 C until the voltage reached 3.0 V.

During a $2^{nd}$ cycle, the coin cells were constant-current charged at a rate of 0.5 C until the voltage reached 4.6 V, and then, while the voltage maintained at 4.6 V, the coin cells were constant-voltage charged until the current reached 0.05 C and then, at a rate of 0.2 C, the coin cells were constant-current discharged until the voltage reached 3.0 V.

During a $3^{rd}$ cycle, the coin cells were constant-current charged at a rate of 0.5 C until the voltage reached 4.6 V, and then, while the voltage maintained at 4.6 V, the coin cells were constant-voltage charged until the current reached 0.05 C and then, at a rate of 1.0 C, the coin cells were constant-current discharged until the voltage reached 3.0 V.

During a $4^{th}$ cycle, the coin cells were constant-current charged at a rate of 0.5 C until the voltage reached 4.6 V, and then, while the voltage was maintained at 4.6 V, the coin cells were constant-voltage charged until the current reached 0.05 C and then, at a rate of 2.0 C, the coin cells were constant-current discharged until the voltage reached 3.0 V.

During a $5^{th}$ cycle, the coin cells were constant-current charged at a rate of 1 C until the voltage reached 4.6 V, and then, while the voltage was maintained at 4.6 V, the coin cells were constant-voltage charged until the current reached 0.05 C and then, at a rate of 1 C, the coin cells were constant-current discharged until the voltage reached 3.0 V.

Some of charging and discharging results are shown in Table 2. Initial columbic efficiency and high-rate characteristics are respectively defined as shown Equations 1 and 2.

$$\text{Initial columbic efficiency[\%]} = [\text{discharging capacity in } 1^{st} \text{ cycle/charging capacity in } 1^{th} \text{ cycle}] \times 100 \quad \text{Equation 1}$$

$$\text{2C capacity retention ratio[\%]} = [\text{discharging capacity in } 4^{th} \text{ cycle/discharging capacity in } 2^{nd} \text{ cycle}] \times 100 \quad \text{Equation 2}$$

TABLE 2

| | Initial charging and discharging efficiency [%] | 2 C capacity retention ratio [%] |
|---|---|---|
| Example 13 | 88.0 | 75.2 |
| Example 14 | 87.6 | 74.7 |
| Example 17 | 87.4 | 71.5 |
| Example 18 | 87.4 | 73.2 |
| Comparative Example 9 | 86.0 | 67.6 |
| Comparative Example 10 | 84.1 | 64.7 |
| Comparative Example 11 | 85.0 | 61.4 |
| Comparative Example 12 | 76.2 | 59.5 |

As shown in Table 2, the lithium batteries manufactured of Examples 13, 14, 17, and 18 had higher initial charging and discharging efficiency and better high-rate characteristics than the lithium batteries manufactured according to Comparative Examples.

Evaluation Example 7: High-Temperature Lifetime Characteristics Evaluation

The coin cells manufactured according to Examples 13, 17, and 18 and Comparative Example 9 were constant-current charged and discharged at a temperature of 45° C. in a voltage range of 3.0 to 4.6 V with respect to lithium metal at a rate of 1 C rate for 70 times. A capacity retention ratio in the $70^{th}$ cycle is indicated as Equation 3. Initial columbic efficiency is indicated as Equation 3. The capacity retention ratio in the 70$^{th}$ cycle is shown in Table 3 and FIG. 3.

Capacity retention ratio in 70$^{th}$ cycle[%]=[discharging capacity in 70$^{th}$ cycle/discharging capacity in 1$^{st}$ cycle]×100   Equation 3

TABLE 3

| | Capacity retention ratio in 70$^{th}$ cycle [%] |
|---|---|
| Example 13 | 82.5 |
| Example 17 | 81.9 |
| Example 18 | 84.1 |
| Comparative Example 9 | 56.8 |

Figure 3:
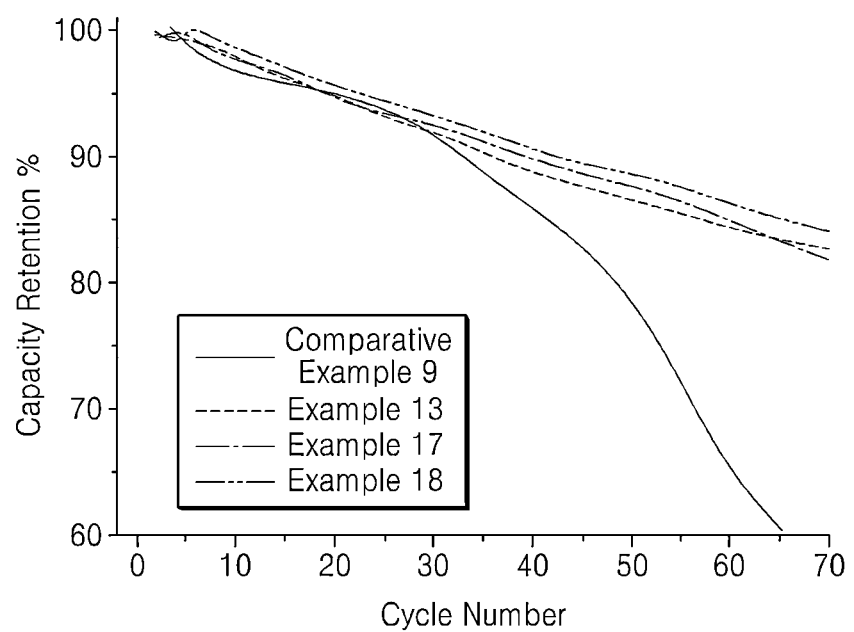
FIG. 3 is a graph of capacity retention (percent, %) versus cycle number which shows lifespan characteristics of lithium batteries manufactured according to Examples 13, 17, and 18 and Comparative Example 9.

As shown in Table 3 and FIG. 3, the lithium batteries manufactured according to Examples 13, 17, and 18 showed substantially improved high-temperature lifespan characteristics compared to lithium battery manufactured according to Comparative Example 9.

According to an embodiment, since a core comprising a lithium intercalatable oxide which enables intercalation and deintercalation of lithium is coated with a lithium metal oxide that is a lithium ion conductor, initial charge and discharge efficiency, high-rate characteristics and lifespan characteristics of lithium batteries may be improved.

It should be understood that the exemplary embodiments described herein shall be considered in a descriptive sense only and not for purposes of limitation. Descriptions of features, advantages, or aspects within each embodiment should typically be considered as available for other similar features, advantages, or aspects in other embodiments.

What is claimed is:

1. A composite cathode active material particle, comprising:
    a core comprising a lithium intercalatable oxide which enables intercalation and deintercalation of lithium; and
    a coating layer disposed on at least a portion of the core, wherein the coating layer comprises a lithium metal oxide that is inactive with respect to an electrode reaction and that is a lithium ion conductor,
    wherein the lithium metal oxide is represented by Formula 1:

$$Li_xMO_y$$   Formula 1 wherein
    4≤x≤6, 4≤y≤6, and
    M is Si, Sc, Y, Ti, Hf, V, Nb, Ta, Cr, Mo, W, Mn, Tc, Re, Fe, Ru, Os, Co, Rh, Ir, Ni, Cu, Zn, Ga, In, Tl, Ge, Sn, or Pb, and
    the lithium metal oxide has a crystallinity of 50% to 99.9%.

2. The composite cathode active material of claim 1, wherein the lithium metal oxide is represented by Formula 2:

$$Li_4MO_4$$   Formula 2 wherein M is Si, Ge, Ti, Mo, Zn, V, Cr, Mn, Fe, Co, Ni, Cu, Ga, Zr, Nb, Tc, Ru, Rh, Pd, Ag, Cd, Sn, W, or Hf.

3. The composite cathode active material of claim 1, wherein the lithium metal oxide includes one or more of Li$_4$SiO$_4$, Li$_4$TiO$_4$ or Li$_4$GeO$_4$.

4. The composite cathode active material of claim 1, wherein an ion conductivity of the lithium metal oxide is 10$^{-9}$ Siemens per centimeter to 10$^{-6}$ Siemens per centimeter at a temperature of 100° C.

5. The composite cathode active material of claim 1, wherein an amount of the lithium metal oxide included in the coating layer of the composite cathode active material is in a range of greater than 0 to 5 weight percent, based on a total weight of the composite cathode active material.

6. The composite cathode active material of claim 1, wherein, when determined by X-ray photoelectron analysis of a surface of the lithium metal oxide, a metal content of the lithium metal oxide with respect to an entire surface composition of the composite cathode active material is 8 atomic percent or less.

7. The composite cathode active material of claim 1, wherein the lithium intercalatable oxide of the core comprises a compound represented by Formula 3:

$$pLi_2MO_3\text{-}(1-p)LiMeO_2$$   Formula 3 wherein 0<p≤0.8,
    M comprises at least one of Ru, Rh, Pd, Os, Ir, Pt, Mg, Ca, Sr, Ba, Ti, Zr, Nb, Mo, W, Zn, Al, Si, Ni, Mn, Cr, Fe, Mg, Sr, V, or a rare earth element, and
    Me comprises at least one of Ti, V, Cr, Mn, Fe, Co, Ni, Cu, Al, Mg, Zr, or B.

8. The composite cathode active material of claim 1, wherein the lithium intercalatable oxide of the core comprises a compound represented by Formula 4:

$$Li[Li_xMe_y]O_{2+d}$$   Formula 4 wherein x+y=1, 0<x<1, 0≤d≤0.1, and
    Me comprises at least one of Mn, V, Cr, Fe, Co, Ni, Zr, Re, Al, B, Ge, Ru, Sn, Ti, Nb, Mo, or Pt.

9. The composite cathode active material of claim 1, wherein the lithium intercalatable oxide of the core comprises a compound represented by Formula 5:

$$Li[Li_xNi_aCo_bMn_c]O_{2+d}$$   Formula 5 wherein x+a+b+c=1, 0<x<1, 0<a<1, 0<b<1, 0<c<1, and 0≤d≤0.1.

10. The composite cathode active material of claim 1, wherein the lithium intercalatable oxide of the core comprises a compound represented by Formula 6:

$$pLi_2MnO_3\text{-}(1-p)LiNi_aCo_bMn_cO_2$$   Formula 6 wherein 0<p<1, 0<a<1, 0<b<1, 0<c<1, and a+b+c=1.

11. The composite cathode active material of claim 1, wherein the lithium intercalatable oxide of the core comprises a compound represented by Formula 7:

$$xLi_2MO_3\text{-}yLiMeO_2\text{-}zLi_{1+d}M'_{2-d}O_4$$   Formula 7 wherein x+y+z=1, 0<x<1, 0<y<1, 0<z<1, and 0≤d≤0.33,
    M comprises at least one of Mg, Ca, Sr, Ba, Ti, Zr, Nb, Mo, W, Zn, Al, Si, Ni, Mn, Cr, Fe, Mg, Sr, V, or a rare earth element,
    Me comprises at least one of Ti, V, Cr, Mn, Fe, Co, Ni, Cu, Al, Mg, Zr, or B, and
    M' comprises at least one of Ti, V, Cr, Mn, Fe, Co, Ni, Cu, Al, Mg, Zr, or B.

12. The composite cathode active material of claim 1, wherein the lithium intercalatable oxide of the core comprises a compound represented by any one of Formulas 8 to 12:

$$Li_xCo_{1-y}M_yO_{2-a}X_a$$   Formula 8

$$Li_xCo_{1-y-z}Ni_yM_zO_{2-a}X_a$$   Formula 9

$$Li_xMn_{2-y}M_yO_{4-a}X_a$$   Formula 10

$$Li_xCo_{2-y}M_yO_{4-a}X_a \quad \text{Formula 11}$$

$$Li_xMe_yM_zPO_{4-a}X_a \quad \text{Formula 12}$$

wherein in Formulas 8 to 12, $0.90 \leq x \leq 1.1$, $0 \leq y \leq 0.9$, $0 \leq z \leq 0.5$, $1-y-z>0$, $0 \leq a \leq 2$, Me comprises at least one of Ti, V, Cr, Mn, Fe, Co, Ni, Cu, Al, Mg, Zr, or B, M comprises at least one of Mg, Ca, Sr, Ba, Ti, Zr, Nb, Mo, W, Zn, Al, Si, Ni, Mn, Cr, Fe, Mg, Sr, V, or a rare earth element, and X comprises at least one of O, F, S, or P.

13. The composite cathode active material of claim 1, wherein the lithium intercalatable oxide of the core comprises a compound represented by Formula 13:

$$Li_xM_yM'_zPO_{4-d}X_d \quad \text{Formula 13}$$

wherein $0.9 \leq x \leq 1.1$, $0 < y \leq 1$, $0 \leq z \leq 1$, $1.9 \leq x+y+z \leq 2.1$, $0 \leq d \leq 0.2$;

M comprises at least one of Fe, Mn, Ni, Co;

M' comprises at least one of Mg, Ca, Sr, Ba, Ti, Zr, Nb, Mo, W, Zn, Al, or Si; and X comprises at least one of S, or F.

14. A cathode comprising the composite cathode active material of claim 1.

15. A lithium battery comprising the cathode of claim 14.

16. A method of preparing a composite cathode active material, the method comprising:

combining
- a lithium metal oxide that is inactive with respect to an electrode reaction and that is a lithium ion conductor, and
- a lithium intercalatable oxide to form a coating layer comprising the lithium metal oxide on a core particle, which comprises the lithium intercalatable oxide, to manufacture the composite cathode active material, wherein the lithium metal oxide is represented by Formula 1:

$$Li_xMO_y \quad \text{Formula 1}$$

wherein
$4 \leq x \leq 6$, $4 \leq y \leq 6$,

M is Sc, Y, Ti, Zr, Hf, V, Nb, Ta, Cr, Mo, W, Mn, Tc, Re, Fe, Ru, Os, Co, Rh, Ir, Ni, Cu, Zn, Ga, In, Tl, Ge, Sn, or Pb, and the lithium metal oxide has a crystallinity of 50% to 99.9%.

17. The method of claim 16, wherein the combining comprises a dry method.

18. The method of claim 17, wherein the dry method comprises a ball mill method, a hybridization method, or a mechanofusion method.

19. The method of claim 16, wherein the combining comprises a wet method.

* * * * *